March 15, 1966 H. K. BECHERER 3,240,631

SEMICONDUCTOR DEVICE AND METHOD OF FABRICATING THE SAME

Original Filed Feb. 16, 1961

INVENTOR.
Hans K. Becherer
BY
Robert C. Fowler
ATTORNEY

United States Patent Office 3,240,631
Patented Mar. 15, 1966

3,240,631

SEMICONDUCTOR DEVICE AND METHOD OF FABRICATING THE SAME

Hans K. Becherer, deceased, late of Kokomo, Ind., by Ingrid F. Becherer, widow and legal representative, Kokomo, Ind., assignor to General Motors Corporation, Detroit, Mich., a corporation of Delaware Continuation of application Ser. No. 89,876, Feb. 16, 1961. This application Dec. 23, 1963, Ser. No. 335,710
4 Claims. (Cl. 148—1.5)

This application is a continuation of my copending United States patent application Serial No. 89,876, filed Feb. 16, 1961, now abandoned.

This invention relates to high power or high current semiconductor devices. As semiconductor devices become more and more popular and the commercial uses grow, the need for such a device that will carry more and more current increases, so that they can be used in more applications.

One of the ways in which a semiconductive material can be treated to conduct additional current is to, in the case of a body having N-type conductivity, add some further impurity to increase the number of free electrons, or if the body is basically P-type conductivity, add an additional impurity to increase the number of electron vacancies or holes. If it is assumed that a PNP transistor is under consideration and that it is desired to increase the current carrying capacity of the same, this can be accomplished by adding an impurity of Group III of the Periodic Table to the emitter or collector electrode to increase the conductivity thereof. The emitter electrode of such a transistor might be formed basically of indium and the addition of such elements as aluminum or gallium from Group III to the indium is known to increase the number of electron vacancies or positive holes and thus increase the efficiency of the body such as the emitter electrode and the current carrying capacity of the transistor.

However, while some efforts to add small quantities of aluminum (1%) to the indium have been successful, efforts to introduce larger amounts have proved more difficult.

It is, therefore, an object in making this invention to provide a process for introducing relatively large amounts of impurities into semi-conductor bodies to increase their current carrying capacity.

It is a further object in making this invention to provide a process for introducing relatively large amounts of aluminum into a basic indium alloy to alter the current carrying capacity thereof.

It is a still further object in making this invention to provide a method of adding at least 3% aluminum to form an aluminum-indium alloy.

With these and other objects in view which will become apparent as the specification proceeds, my invention will be best understood by reference to the following specification and claims and the illustrations in the accompanying drawings, in which:

Figure 1:
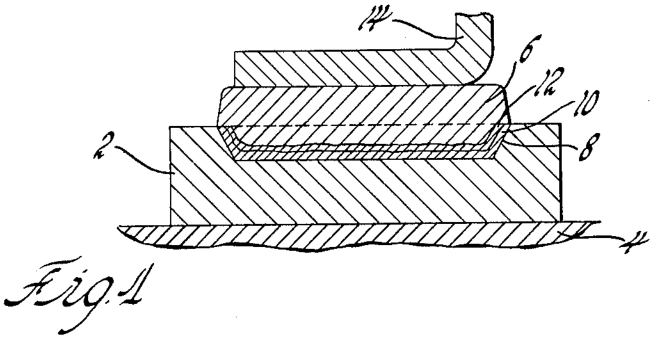
FIGURE 1 is an enlarged vertical sectional view taken through a semiconductor rectifier illustrating the form of the rectifying barrier between the N and P zones.

Referring now more particularly to the drawings, FIGURE 1 shows the simplest form of semiconductor device with which my invention can be utilized and in that case the semiconductor structure is shown as a simple rectifier. The rectifier consists in this example of a main body 2 which may be formed of germanium having N-type conductivity. This body is mounted permanently upon any supporting base 4 which preferably is formed of a material having both good electrical and heat conducting properties. It may be secured thereto by solder or any other satisfactory means. Alloyed to the top face of the germanium body 2 is a block 6 of, for example, indium which upon being placed in juxtaposition to the germanium block 2 and having the ambient temperature raised, alloys into the upper surface of the block 2 to form a rectifying barrier 8 which may be called the emitter junction. In order to increase the number of positive holes in the emitter electrode and thus increase its current carrying capacity it is proposed to introduce a desired amount of some element from Group III such as aluminum to the same. This can be done by a process to be described in which case the aluminum penetrates into the indium and as a result forms a layer 10 of aluminum, indium saturated P-type germanium at a point just above the junction 8. Also closely lining that area there is a further strata formed by a thin section 12 of germanium-indium-aluminum eutectic. Upon the injection of a desired amount of aluminum into the P-type body forming the emitter electrode it has been found that this configuration of layers is present and indicates that the desired result has been obtained. A connecting electrode 14 is lastly soldered to the upper face of the emitter electrode 6.

Figure 4:
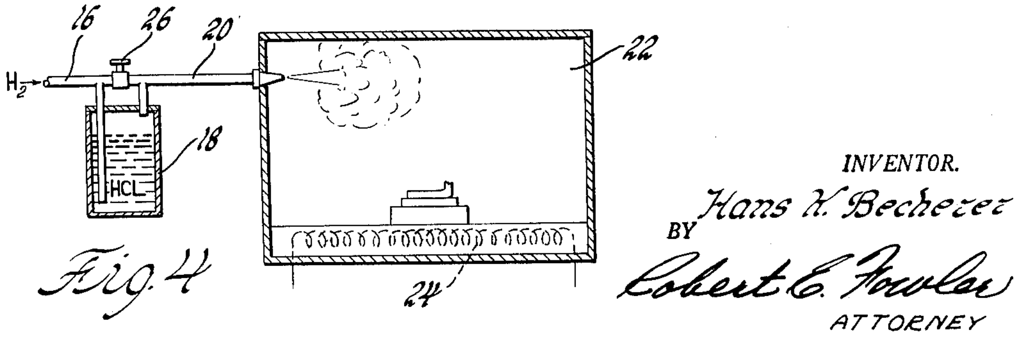
FIGURE 4 is a schematic diagram showing the apparatus utilized in injecting the desired amount of aluminum into the rectifier electrode.

In order to obtain an alloying of a sufficient amount of aluminum to produce the result described the following process has been discovered. First an alloy material is prepared which consists of 97% indium (99.99% pure) and 3% aluminum (99.99% pure) which materials are heated to 750° C. in a hydrogen atmosphere with a certain amount of wet HCl picked up by means of bubbling the hydrogen gas through a bottle containing high concentrated HCl acid at the rate of approximately 30 bubbles per minute. Such apparatus is shown in FIGURE 4 wherein the hydrogen gas $H_2$ is shown introduced to the left-hand end of tube 16 where it can bubble down through concentrated hydrochloric acid in a container 18 and thence out through tube 20 and be injected into an enclosure 22 where the materials to be alloyed are located during the time the temperature is raised to the desired point by suitable heating means such as an electric heating coil 24. The amount of hydrogen gas which is forced through the hydrochloric acid is controlled by the valve 26. After the alloy has been formed, it is cooled rapidly in the same atmosphere to room temperature and then taken out of the enclosure.

This alloy is then rolled and punched to provide pellets for alloying the emitter electrode of a rectifier or transistor. However, prior to alloying the pellets to germanium wafers the pellets are cleaned by washing in acetone and dried. They are used promptly and should not be stored for any length of time. The indium-aluminum alloy pellet may then be mounted on one side of the germanium wafer and alloyed thereto by pressing the same against the germanium wafer in the same hydrogen atmosphere but this time only raising the temperature in the enclosure to 400° C. and bubbling the hydrogen through the concentrated HCl acid at a reduced rate such as approximately 15 bubbles per minute. This will produce an emitter dot or electrode having increased current carrying capacity.

If a transistor or rectifier has been fabricated utilizing a conventional indium dot or electrode, its operation can be improved by placing one of the previously mentioned indium-aluminum alloyed pellets on top of the indium emitter electrode and firing the same for a second time in the presence of the hydrochloric gas as just mentioned. This will increase the amount of aluminum in the emitter and also the current carrying capacity.

After alloying the transistor or rectifier either a first or a second time the element is electrically etched in a solution containing 40% KOH, then dipped in warm distilled water, next in a weak 1% hydrochloric acid solution followed by distilled water again, then in an acetone bath, and lastly ultrasonically cleaned for ten minutes in acetone and dried thereafter. By using this method much higher amounts of aluminum have been injected into the indium to increase the current carrying capacity thereof and to improve the operation.

Figure 2:
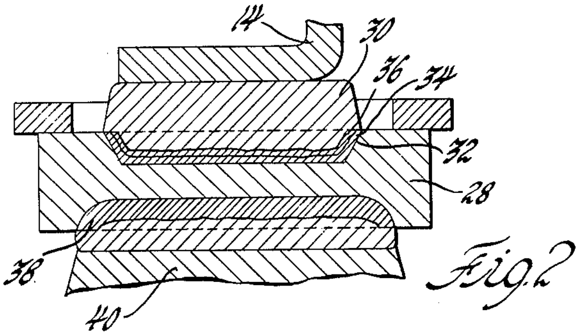
FIGURE 2 is a similar sectional view taken through a transistor and illustrating the two rectifying barriers formed at the emitter and collector electrodes, respectively.

FIGURE 2, as mentioned, discloses a transistor construction instead of a rectifying diode in which case the germanium wafer 28 has secured to its upper face an emitter electrode 30 which consists of an indium-aluminum alloy which provides the distinctive rectifying areas mentioned with respect to FIGURE 1. In other words an emitter junction barrier 32 is formed between the emitter and base 28, an aluminum-indium saturated P-type germanium layer 34 is next thereto and a germanium-indium-aluminum eutectic layer 36 follows in the same manner as specifically described with the diode 2 of FIGURE 1. On the opposite face a collector electrode 38 is shown which is mounted directly on a mounting pedestal 40 by any suitable means such as soldering and which pedestal 40 is formed of good electrical and heat conducting material and acts as the collector terminal.

Figure 3:
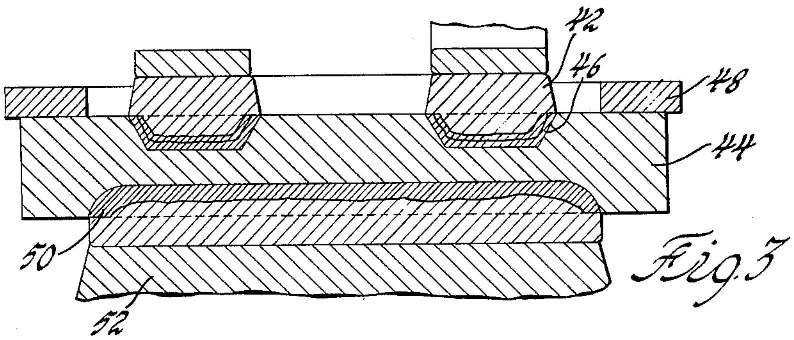
FIGURE 3 is a similar sectional view through a transistor in which the emitter electrode is of the ring variety rather than the dot or disc type.

FIGURE 3 shows the same type of structure but in this instance a ring-type emitter is illustrated rather than the dot or disc type 30. Therefore, the ring emitter 42 would be formed of the aluminum-indium alloy and its alloying into the upper surface of the base electrode 33 would provide the same general type of emitter junction barrier 46 together with other strata layers, but of course, its configuration would follow the ring emitter configuration. An outside base ring connection 48 is also shown in FIGURE 3 and a collector electrode 50 mounted on a supporting pedestal 52.

By the use of the process herein disclosed relatively high percentages of aluminum have satisfactorily been alloyed into the indium electrodes to increase the current carrying capacity of the whole device.

It is claimed:

1. The method of making a semiconductor device having areas of two different types of conductivity comprising the steps of placing a quantity of metal in a container, said metal consisting essentially of over 1% up to about 5% aluminum and the balance substantially all indium, providing an atmosphere consisting essentially of hydrogen gas which has been wetted with hydrochloric acid for said container, fusing said metal quantity in said atmosphere, mixing the fused metal in said atmosphere, cooling the resultant alloy to solidify it, forming a discrete electrode shape from said solid alloy, applying said electrode shape to a generally correspondingly shaped indium electrode having less than 1% aluminum which has already been alloyed to an N-type germanium surface, exposing the applied alloy shape to an atmosphere consisting essentially of hydrogen wetted with hydrochloric acid and under said atmosphere fusing the alloy shape with said indium electrode to form an improved indium alloy electrode containing relatively high percentages of aluminum.

2. The method of making a semiconductor device having areas of two different types of conductivity comprising the steps of placing a quantity of metal in a container, said metal consisting essentially of over 1% up to about 5% aluminum and the balance substantially all indium, providing an atmosphere consisting essentially of hydrogen which has been wetted with hydrochloric acid for said container, fusing said metal quantity in said atmosphere, mixing the fused metal in said atmosphere, cooling the resultant alloy to solidfy it, applying the solidified alloy to an electrode having less than 1% aluminum which has already been alloyed to an N-type germanium surface, exposing the alloy and the electrode to an atmosphere consisting essentially of hydrogen wetted with hydrochloric acid and under said atmosphere fusing the alloy to the electrode to form an improved alloy electrode containing relatively high percentages of aluminum.

3. The method of making a semiconductor device having areas of two different types of conductivity comprising the steps of placing a quantity of metal in a container, said metal consisting essentially of about 3%–5% aluminum and the balance substantially all indium, providing an atmosphere consisting essentially of hydrogen gas which has been wetted with hydrochloric acid for said container, fusing said metal quantity in said atmosphere, mixing the fused metal in said atmosphere, cooling the resultant alloy to solidify it, forming a discrete electrode shape from said solid alloy, applying said electrode shape to a generally correspondingly shaped indium electrode having less than 1% aluminum which has already been alloyed to an N-type germanium surface, exposing the applied alloy shape to an atmosphere consisting essentially of hydrogen wetted with hydrochloric acid and under said atmosphere fusing the alloy shape with said indium electrode to form an improved indium alloy electrode containing relatively high percentages of aluminum.

4. The method of making a semiconductor device having areas of two different types of conductivity comprising the steps of placing a quantity of metal in a container, said metal consisting essentially of about 3%–5% aluminum and the balance substantially all indium, providing an atmosphere consisting essentially of hydrogen which has been wetted with hydrochloric acid for said container, fusing said metal quantity in said atmosphere, mixing the fused metal in said atmosphere, cooling the resultant alloy to solidify it, applying the solidified alloy to an electrode having less than 1% aluminum which has already been alloyed to an N-type germanium surface, exposing the alloy and the electrode to an atmosphere consisting essentially of hydrogen wetted with hydrochloric acid and under said atmosphere fusing the alloy to the electrode to form an improved alloy electrode containing relatively high percentages of aluminum.

References Cited by the Examiner

UNITED STATES PATENTS

| | | | |
|---|---|---|---|
| 2,833,678 | 5/1958 | Armstrong | 148—1.5 |
| 2,836,522 | 5/1958 | Mueller | 148—33.6 X |
| 2,862,840 | 12/1958 | Kordolewski. | |
| 2,878,432 | 3/1959 | Armstrong | 148—1.5 X |
| 2,887,416 | 5/1959 | Van Amstel | 148—185 |
| 2,932,594 | 4/1960 | Mueller | 148—182 X |
| 2,957,788 | 10/1960 | Armstrong | 148—185 |
| 2,960,418 | 11/1960 | Zierdt | 148—178 |
| 3,002,864 | 10/1961 | Van Amstel | 148—33.6 X |
| 3,014,819 | 12/1961 | Hunter | 148—178 |

OTHER REFERENCES

Metals Handbook, 1948 edition, pages 332–334.

Weingarten "Method of Fusing Indium-Aluminum Alloys to Germanium" RCA T.N. No. 33.

DAVID L. RECK, *Primary Examiner.*

HYLAND BIZOT, *Examiner.*